United States Patent [19]

Freude

[11] 4,164,744
[45] Aug. 14, 1979

[54] DISPOSABLE PRINTING HEAD FOR RECORDING MEASURING INSTRUMENTS, AND THE LIKE

[75] Inventor: Paul Freude, Düren-Birgel, Fed. Rep. of Germany

[73] Assignee: Dia-Nielsen GmbH Zubehör für die Messtechnik, Duren, Fed. Rep. of Germany

[21] Appl. No.: 851,776

[22] Filed: Nov. 15, 1977

[30] Foreign Application Priority Data

Nov. 16, 1976 [DE] Fed. Rep. of Germany ... 7636092[U]

[51] Int. Cl.$^2$ ............................................. G01D 15/16
[52] U.S. Cl. ................................. 346/140 A; 101/328; 346/46; 400/470
[58] Field of Search ............... 346/140 A, 140 R, 141, 346/46; 101/327, 328, 368; 400/470

[56] References Cited

U.S. PATENT DOCUMENTS

| | | | |
|---|---|---|---|
| 2,082,591 | 6/1937 | Newman | 346/140 A X |
| 3,252,164 | 5/1966 | Herte | 346/140 A |
| 3,311,919 | 3/1967 | St. Clair | 346/46 X |
| 3,783,785 | 1/1974 | Frank | 101/328 |
| 4,024,547 | 5/1977 | Raahauge | 346/140 A |

FOREIGN PATENT DOCUMENTS 6618160 6/1968 Netherlands ......................... 346/140 A Primary Examiner—Joseph W. Hartary
Attorney, Agent, or Firm—Neil F. Markva

[57] ABSTRACT

The disposable printing head assembly includes a printing head frame structure fitted with a plurality of printing tips or pens. The printing head frame structure includes a plurality of separate store chambers including store material for containing the color printing material. The color store material may be the same or of different colors from one chamber to the other. At least one printing tip is disposed in each color store chamber. The printing tips are formed with different printing symbols such as a point, cross, star or circle.

12 Claims, 4 Drawing Figures

DISPOSABLE PRINTING HEAD FOR RECORDING MEASURING INSTRUMENTS, AND THE LIKE

BACKGROUND OF THE INVENTION

This invention relates to a disposable printing head assembly for recording measuring instruments and the like. More particularly, the assembly of this invention relates to the specific configuration for the printing tips or pens and their relationship with respect to the printing head frame structure.

Disposable printing head assemblies are well known. Such assemblies are used with writing measuring instruments to print a line, curve, or the like, on a diagram by means of a printing tip or printing pen in predetermined intervals. When the tip is a printing pen having an acute shape, it will form a corresponding print which is punctiform when it is placed on a support means. Thus, a dotted line is printed through the use of such a pen. It is also possible to form a dotted line that is printed in different colors. That is, the printing pens or printing tips are colored with a corresponding color from pads having different colors. In these prior art printing head assemblies, the types of markings are relatively limited. Generally, the only colors used are black, green, blue, brown, red and violet. Practically, the recording possibilities are restricted to six channels.

SUMMARY OF THE INVENTION

The primary object of the invention is to provide a disposable printing head assembly in which more than six channels may be used. The disposable printing head assembly of this invention includes printing tips comprising different symbols to be printed. In addition to the symbol of a point, other symbols such as a circle, cross, two or more circles, one disposed in the other, a cross and circle, star and the like, are provided.

Thus, in accordance with this invention, other symbols may be printed in addition to the point symbol. These other symbols differ in their configurations substantially when compared with respect to each other. Consequently, it is possible to record with a disposable printing head assembly provided with a printer having more than six channels. A plurality of this type of symbols can be used so that more than six channels can be printed with a single color. With the use of further colors, the number of useful channels can be additionally substantially increased.

A further feature of the invention, is directed to a printing head assembly having a frame structure with a plurality of enclosed storage chambers into which color store material containing different coloring materials are disposed. At least one printing tip is associated with each storage chamber. Advantageously, the printing tips of the printing head assembly are fitted with different symbols.

In accordance with another feature of the invention, the printing tips are composed of an open-pore, foamed, sintered or fibrous material which may be plastic or the like. The printing tips have a structural configuration effective for insertion into direct contact with the storage material. Each printing tip has a shaft portion at one end which projects into the color store material so that the surface of the printing tip gets the required color. The other end of the printing tips may have different printing symbols thereon. Printing symbols themselves are designed to convey the effect of the colors from the inside of the printing head frame structure to the printing surface by a capillary effect. Thus, the colors are appropriately supplied to a recording chart or the like with which the recording head assembly is associated.

In another embodiment of the invention, the printing tips and the color storage material are formed into a single piece. That is, the material in the printing tips protruding outside of the head frame structure is the same as the material constituting the color storage material. The printing tips must be of a nondeformable configuration.

The separately formed printing tips that are inserted into the printing head have a frusto-conical head portion at one end, a shaft portion at the other end and an adaptor portion disposed therebetween.

The frusto-conical head portion includes a printing surface which is formed as a special symbol such as a dot, cross, star, circle and the like. The printing head frame structure includes at least one bore for a color storage chamber. The adaptor portion is shaped to fit into an engagement with the bore so that the shaft portion extends inwardly with respect to the frame structure into direct contact with the color storage material. Thus, the color reaches the printing symbol at the outwardly directed free end of the printing tip through a capillary action moving color printing material from the shaft portion through the adaptor and head portions.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figures 1, 2:
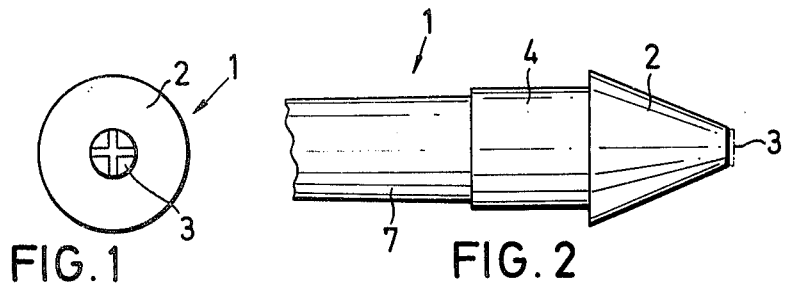
FIG. 1 is a schematic elevational view of the printing symbol end of a printing tip made in accordance with this invention.
FIG. 2 is a fragmentary side elevational view of a printing tip made in accordance with this invention.
Figure 3:
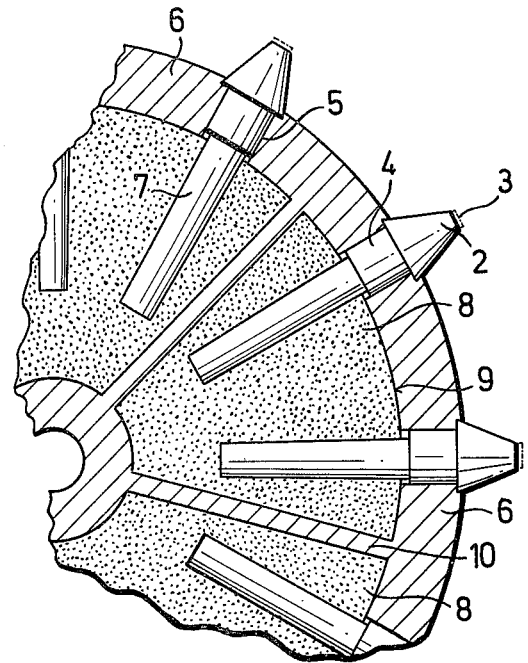
FIG. 3 is a fragmentary sectional view of a printing head assembly made in accordance with this invention.

Referring to FIGS. 1-3, a disposable printing head frame structure 6 is fitted with a plurality of printing tips, generally designated 1. The printing tips or pens are disposed around the periphery of the frame structure 6. Each tip 1 has a frusto-conical head portion 2 on which a printing symbol 3 is disposed at its free front end. The printing symbol may be of a different configuration, such as a dot surface, a cross, a star, a circle, double circles, and the like. A plurality of bores 5 are disposed in the frame structure 6. An adaptor portion 4 is disposed adjacent the head portion 2 and designed to be firmly placed or engaged in each bore 5 as shown. As is evident in the drawings, head portion 2 has a base diameter greater than the diameter of adaptor portion 4. A shaft portion 7 located at the other end of the tip 1 projects into a color storage material 8. As shown, the diameter of shaft portion 7 is less than the diameter of the diameter of adaptor portion 4. There are a plurality of storage chambers 9 located inside the printing head frame structure 6. The color material moves through capillary action from the color storage material 8 through the shaft portion 7 and outwardly to the printing surface symbol 3.

Different colors may be disposed in each of the plurality of color storage chambers 9 which contain the color storage material 8. If printing tips having different symbols are used in conjunction with the chambers 9, a plurality of channels can be distinctly well recorded. It is possible that the storage chambers 9 have a size sufficient to accommodate more than one printing tip 1. That is, more than one shaft portions 7 may extend into the color storage material 8 as shown in FIG. 3. The printing tips in this case may carry different printing symbols. In this particular embodiment, the storage chambers 9 are separated by stems 10.

The printing tips 1 are advantageously constructed of open-pore, foamed, sintered or fibrous material. This material may be made of a plastic composition. The printing tips 1 are in contact with the corresponding color storage material 8 so that they may take color material from a particular chamber 9 to the symbols 3 at the free ends of the tips 1 by capillary action.

Figure 4:
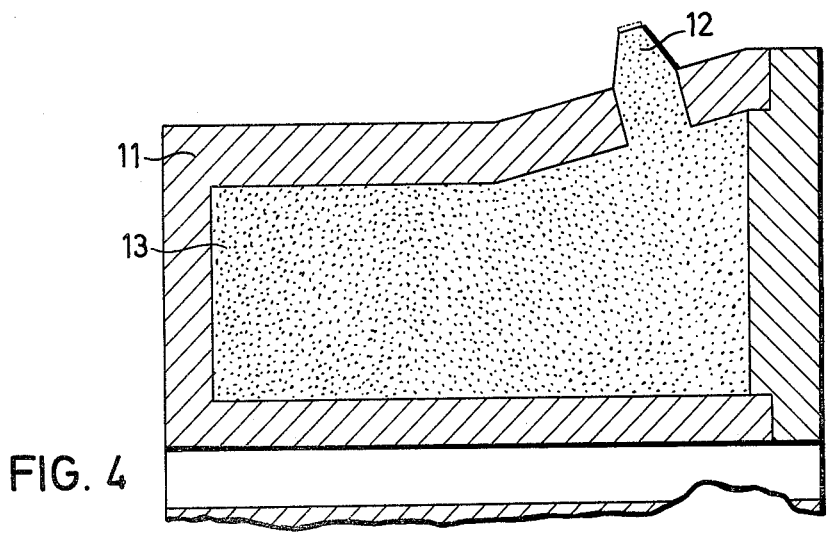
FIG. 4 is a further embodiment of a disposable printing head assembly shown in cross section.

A further embodiment of the invention is shown in FIG. 4. The disposable printing head frame structure 11 incorporates a single unit having an integrally formed printing tip 12 in color storage material 13. The colored storage material 13 has such a consistency that the printing tip 12 is stable. That is, tip 12 has a nondeformable structural configuration. The printing head frame structure 11 may have different chambers separated from each other which are filled always with a different color in a color storage material. Thus, a plurality of marking possibilities can be achieved which differ from each other by the printing symbols and by the color being used.

The printing head frame structures 6 and 11, in the two embodiments as shown, may advantageously be made of a plastic material. Further, the printing head frame structures 6 and 11 have a structural configuration shaped to be exchangeable at the printing device. This is in accordance with well known technology associated with disposable printing head assemblies.

While the disposable printing head for recording measuring instruments, and the like, has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A disposable printing head assembly for recording measuring instruments and the like, said assembly comprising:
    (a) a printing head frame structure fitted with a plurality of printing tips or pens,
    (b) said printing tips being composed of open-pore foamed, sintered or fibrous material and being formed with different printing symbols such as a point, cross, star, or circle,
    (c) said head frame structure including a store material and a plurality of bores for receiving said printing tips,
    (d) said printing tips having a frusto-conical head portion, an adaptor portion and a shaft portion,
    (e) each said head portion having a base diameter that is greater than the diameter of each said adaptor portion which is engaged in a bore of the printing head,
    (f) the head portion being disposed at one end of the printing tip and projecting outside of the head frame structure,
    (g) the shaft portion forming the other end of the printing tip and being inserted into direct contact with said store material,
    (h) said adaptor portion being disposed between the head portion and the shaft portion.

2. An assembly as defined in claim 1 wherein the shaft portion has a diameter less than the diameter of the adaptor portion.

3. An assembly as defined in claim 1 wherein the composition of the printing tip material is plastic.

4. An assembly as defined in claim 1 wherein said store material contains color printing material is located with the head frame structure, said printing tips being composed of the same material as the color store material and having a nondeformable configuration.

5. An assembly as defined in claim 4 wherein the printing tips and the color store material are integrally formed into a single unit.

6. A disposable printing head assembly for recording measuring instruments and the like, said assembly comprising:
    (a) a printing head frame structure fitted with a plurality of printing tips or pens,
    (b) said printing head frame structure including a plurality of enclosed color store chambers for containing color store material, and
    (c) at least one printing tip being composed of open-pore foamed, sintered or fibrous plastic material and disposed in the printing head frame structure for each color store chamber,
    (d) said printing head frame structure including a plurality of bores for receiving said printing tips,
    (e) each said color store chamber having at least one bore associated therewith,
    (f) the printing tips having a frusto-conical head portion, an adaptor portion and a shaft portion with the adaptor portion being disposed between the head portion and the shaft portion,
    (g) each said head portion having a base diameter that is greater than the diameter of each said adaptor portion which is engaged in a said bore, p1 (h) the head portion at one end of each printing tip projects outwardly from the printing head frame structure and the shaft portion at the other end of the printing tips is inserted into the color store material.

7. An assembly as defined in claim 6 wherein there are a plurality of printing tips in each color store chamber, and the printing tips in a single store chamber are formed with different printing symbols.

8. An assembly as defined in claim 6 wherein the shaft portion has a diameter less than the diameter of the adaptor portion.

9. An assembly as defined in claim 6 wherein the printing tips and the color store material are composed of the same compositional material, said printing tips having a nondeformable configuration and being integrally formed in a single unit with the color store material.

10. A disposable printing head assembly for recording measuring instruments and the like, said assembly comprising:
(a) a printing head frame structure fitted with a plurality of printing tips or pens being composed of open-pore foamed, sintered or fibrous material,
(b) said printing head frame structure including a plurality of separate color store chambers,
(c) color store material having a non-deformable configuration with the same or different color being disposed in each of the color store chambers,
(d) at least one of the printing tips being disposed in each color store chamber, and
(e) said printing tips being formed with different printng symbols such as a point, a cross, star or circle,
(f) said head frame structure including a plurality of bores for receiving said printing tips,
(g) said printing tips having a frusto-conical head portion, an adaptor portion and a shaft portion,
(h) each said head portion having a base diameter that is greater than the diameter of each said adaptor portion which is engaged in a bore of the printing head.
(i) the head portion being disposed at one end of the printing tip and projecting outside of the head frame structure,
(j) the shaft portion forming the other end of the printing tip inserted into said store material, and
(k) said adaptor portion being disposed between the head portion and the shaft portion.

11. An assembly as defined in claim 10 wherein the composition of the printing tip material is plastic.

12. An assembly as defined in claim 10 wherein the printing tips and the color store material are integrally formed into a single unit.

* * * * *